United States Patent [19]
Drexel et al.

[11] Patent Number: 5,259,243
[45] Date of Patent: Nov. 9, 1993

[54] FLOW SENSOR

[75] Inventors: Charles F. Drexel, Rolling Hills, Calif.; Daniel T. Mudd, St. Charles, Mo.; Hamid Saghatchi, Orange, Calif.

[73] Assignee: DXL International, Inc., Torrance, Calif.

[21] Appl. No.: 638,463

[22] Filed: Jan. 4, 1991

[51] Int. Cl.$^5$ .................................................. G01F 1/68
[52] U.S. Cl. ................................. 73/204.25; 73/204.22
[58] Field of Search ........... 73/204.12, 204.15, 204.17, 73/204.26, 204.27, 204.25, 204.22

[56] References Cited

U.S. PATENT DOCUMENTS

| | | |
|---|---|---|
| 2,525,197 | 10/1950 | Beams . |
| 2,594,613 | 4/1952 | Booth . |
| 2,729,976 | 1/1956 | Laub ................................ 73/204.16 |
| 2,832,018 | 4/1958 | Laub . |
| 3,650,151 | 3/1972 | Drexel . |
| 4,519,246 | 5/1985 | Hartemink ................ 73/204.27 X |
| 4,616,505 | 10/1986 | Jouwsma ......................... 73/204.26 |
| 4,686,856 | 8/1987 | Varva et al. ..................... 73/204.15 |

FOREIGN PATENT DOCUMENTS 0081421  7/1981  Japan ................. 73/204.22

OTHER PUBLICATIONS

"Les Debitmetres Thermiques et Leurs Emplois", Jacque Mercier (Oct. 1969).
"A Sensitive Recording Calorimetric Mass Flowmeter", A. F. Brown and H. Kronberger.

*Primary Examiner*—Herbert Goldstein
*Attorney, Agent, or Firm*—Spensley Horn Jubas & Lubitz

[57] ABSTRACT

A flow meter has an elongate housing with a fluid inlet, a fluid outlet and an axial passage therebetween. The fluid passage contains a flow sensor assembly operationally connected in parallel to a flow splitter section. The flow sensor assembly has a flow tube forming an axial passage therethrough and the flow tube has a thermally diffusive sensor region. An upstream resistance thermometer and a downstream resistance thermometer are in thermal contact with the sensor region. The sensor region can additionally contain an electrically insulating coating on its outside surface and resistance thermometers formed by winding a single layer of a fine, uninsulated wire around its outside surface. The sensor assembly can be surrounded by inner and outer housings made of electrically and thermally conductive material connected to the flow tube near the ends of the sensor region and grounded to a printed circuit board.

21 Claims, 1 Drawing Sheet

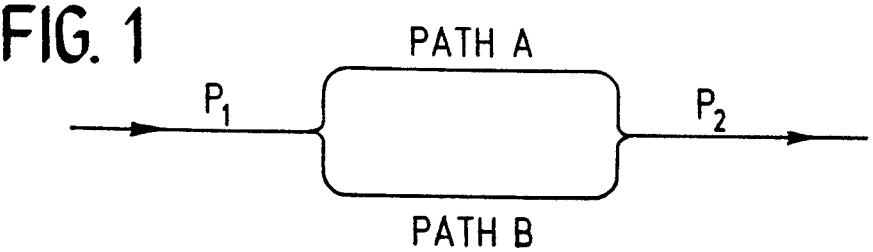
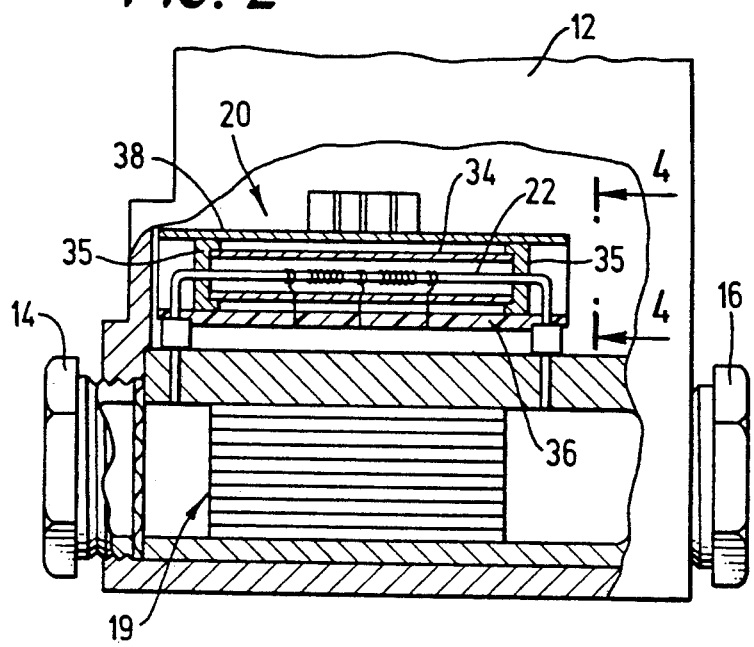
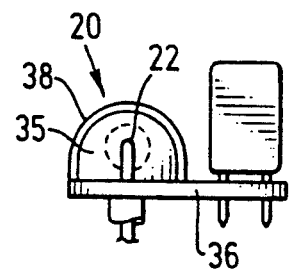
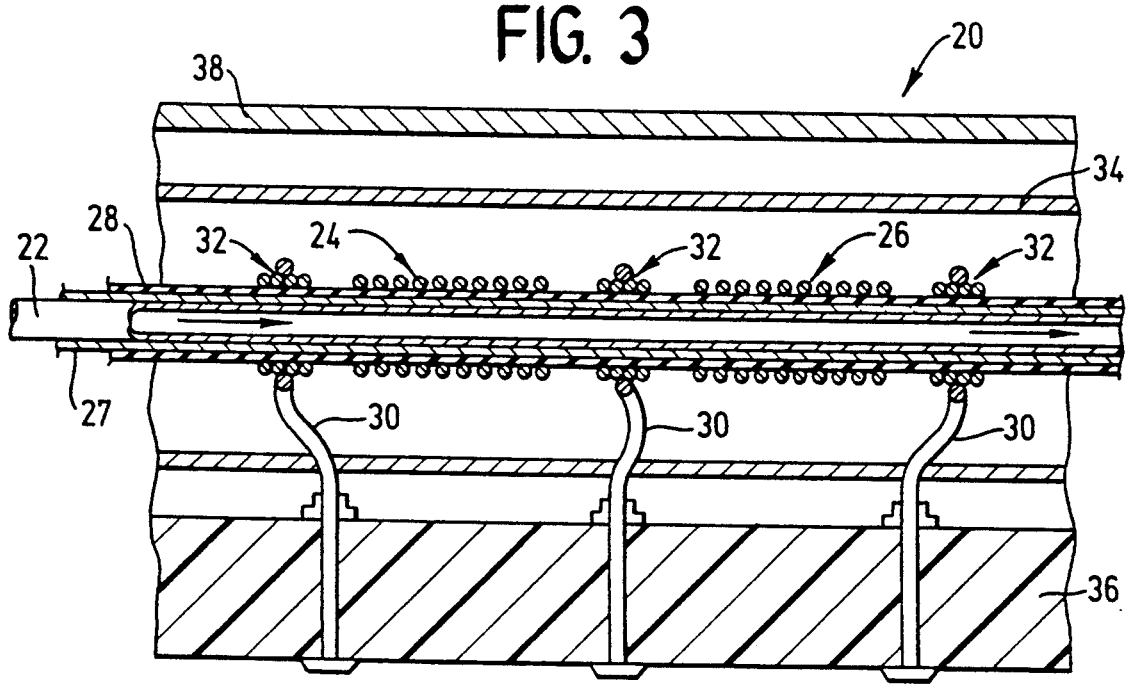

FLOW SENSOR

BACKGROUND OF THE INVENTION

1. Field of the Invention

This invention relates to the mechanical arts. In particular, it relates to instruments for measuring and controlling the flow of fluids, such as gases.

2. Discussion of Relevant Art

The measurement and control of the flow of gases is important in many industries. During the manufacture of semiconductors, for example, many of the processes require a precise reaction of two or more gases under carefully controlled conditions. Since chemical reactions occur on a molecular level, the control of mass flow is the most direct way to regulate the reactants.

There have been developed in the art a variety of instruments for measuring the mass flow rate of gases from below 5 standard cubic centimeters per minute (SCCM) to more than 500,000 SCCM. The prevalent design of such instruments requires that the flow of the gas be divided into two or more paths.

In a typical instrument, a small amount of gas is routed through a flow sensor assembly, where the mass flow is measured, while most of the flow is routed through a splitter section located in parallel with the flow sensor assembly. The flow sensor assembly contains a flow tube that carries two resistance thermometers on its outside surface. The flow tube has an inside diameter of only about 0.01 to about 0.05 inch. The resistance thermometers are formed by winding multiple layers of insulated sensor wire, generally having a diameter of about 0.0006 inches, around the outside of the flow tube to form coils. To reduce induced signals from electromagnetic waves, upstream and downstream sensor coils are wound in opposite directions of rotation.

The resistance thermometers form two legs of an electronic sensor bridge; the other two legs are fixed resistors. The sensor assembly must be carefully designed and manufactured so that the two resistance thermometers are as identical as possible in electrical and thermal characteristics.

When a voltage is applied across the bridge, current passes through the resistance thermometers causing them to self-heat. Since they are nearly identical in electrical and thermal characteristics, the temperature of each resistance thermometer increases by the same amount, causing the electrical resistance in each to increase by the same amount—for so long as there is no gas flow through the flow tube. As soon as gas flow occurs, the upstream sensor wire is cooled by heat transfer to the flowing gas and the downstream sensor wire is either heated or cooled to a lesser extent. The average temperature of the upstream resistance thermometer will now be different than the temperature of the downstream resistance thermometer and the electrical bridge will show an imbalance due to the difference in their resistance.

So long as the flow sensor is not affected by external influences, the temperature difference between the resistance thermometers is only due to the mass flow and the specific heat of the gas. Therefore, if the specific heat is known, the mass flow can be directly measured.

Speed of response is a desired quality in flow measurement and control. Presently, it takes sensor assemblies from about one to eight seconds to respond to within two percent of a steady state value when the flow rate of a gas is changed. Although flow meters can be made to operate more quickly by use of electronic signal conditioning, ultimately it is the flow sensor assembly which limits the speed of the system.

Another desired quality in mass flow measurement and control is linearity. A linear mass flow system greatly simplifies interaction with an instrument's automatic process control systems. The sensor assemblies which are commercially available have a typical nonlinearity effect of approximately three to five percent variation from an ideal straight line response.

A critical and failure-prone area of sensor assemblies is the termination of the very fine sensor wire to a much larger wire in order to make electrical connection and form the electronic sensor bridge. The problem is compounded by the fact that thermal inertial masses, such as large lead wires or terminal connectors, attached to the sensor must be kept to a minimum in order not to slow the response and reduce the electrical output of the sensor assembly. This termination is handled in a variety of ways in existing flow meters. Unfortunately, all of the ways involve problems that result either by having an imbalance created between the two resistance thermometers or by requiring excessive thermal mass, which slows the sensor assembly's response.

Free convection currents can create attitude sensitivity problems when conventional sensor assemblies are tilted, so that one sensor is higher than the other. Convection currents are caused by warmer gases near the flow tube rising due to buoyancy forces. When the flow sensor assembly is horizontal, these warm currents rise at right angles to the flow tube and do not circulate axially along the flow tube. However, when the flow sensor assembly is tilted, these warm currents have an axial component, relative to the flow tube, and the rising warm gas transfers heat from the lower resistance thermometer to the higher resistance thermometer. This heat transfer results in a temperature differential between the two thermometers and gives a false indication of flow through the flow tube.

Conventional flow meters have attempted to block free convection currents on the outside of the flow tube by encapsulating the resistance thermometers in a foam material of low thermal mass. Unfortunately, the addition of the foam material in contact with the resistance thermometers reduces the thermal resistance between the resistance thermometers and the surrounding environment. As a result, the sensor assembly's operating temperature and output signal is reduced. In addition, over a period of time, the thermal resistance of the foam can change due to thermal expansion or contraction, chemical changes or inertial effects. These changes result in long-term drift in the output. Moreover, the foam material increases the thermal mass adjacent to the flow tube. This increase in thermal mass slows the flow sensor assembly's speed of response to internal thermal changes due to different mass flow rates.

Another attempt at minimizing attitude sensitivity in mass flow meters involves using a single housing, made of metal or material having a relatively high thermal conductivity, spaced closely to the sensors. Unfortunately, the housing does not completely eliminate the problems which can arise because of free convection currents.

Additionally, electromagnetic waves can induce electrical currents of considerable strength in the flow tube and resistance thermometers. Problems arise, when these elements interact with such electromagnetic waves and act as transformers creating voltages across the sensor bridge that are not related to gas flow.

SUMMARY OF THE INVENTION

In accordance with this invention, there has now been found a mass flow sensor assembly which can be simply and effectively attached to terminal wires to form an electronic sensor bridge, which is immunized from outside thermal and electromagnetic influences and which substantially eliminates false signals due to free convection currents. The flow sensor assembly provides quick response to changes in mass flow and excellent linearity over a wide range of operating conditions.

The mass flow meter in accordance with this invention has an elongate housing with a fluid inlet, a fluid outlet and a fluid passage between the two. The fluid passage contains a flow splitter section and is operationally connected in parallel to a flow sensor assembly which measures the rate of fluid flow.

The flow sensor assembly has a flow tube forming an axial passage therethrough. The flow tube has a thermally diffusive sensor region. An upstream resistance thermometer and a downstream resistance thermometer, spaced apart from the upstream resistance thermometer, are formed of wire wound around the outside surface of the sensor region. The resistance thermometers have means for attaching terminal wires to form an electronic bridge.

In some embodiments the sensor region additionally contains an electrically insulating coating on the outside surface of the thermally diffusive sensor region. In these embodiments, the resistance thermometers are formed by winding a single layer of a fine, uninsulated wire around the outside surface of the sensor region.

In some embodiments the first and second resistance thermometers are attached to terminal wires by soldering to connector pads formed by winding uninsulated sensor wire around the flow tube with spacing that is sufficiently close and for a distance sufficiently long to define a connector pad.

Also in some embodiments, the sensor assembly has an inner housing made of an electrically conductive and thermally diffusive material closely spaced, radially, to the sensing region and electrically connected to the flow tube near the ends of the sensor region, an outer housing made of an electrically conductive and thermally diffusive material closely spaced, radially, to the inner housing and electrically connected to the flow tube near the ends of the sensor region and a printed circuit board, electrically connected to the electronic sensor bridge and grounded to the inner and the outer housings, on which the outer housing is mounted.

BRIEF DESCRIPTION OF THE DRAWINGS

FIG. 1 is a schematic representation of the flow of a fluid through the measuring section of a flow meter.

FIG. 2 is an illustration, in partial cross-section, of a flow meter incorporating one embodiment of a flow sensor assembly in accordance with the invention.

FIG. 3 is an enlarged illustration of a portion of the flow meter shown in FIG. 2.

FIG. 4 is an illustration, in cross-section, taken on line 4—4 of FIG. 2.

DETAILED DESCRIPTION OF THE PREFERRED EMBODIMENTS

As required, details of illustrative embodiments of the invention are disclosed. However, it is to be understood that these embodiments merely exemplify the invention which may take forms different from the specific embodiments disclosed. For example, while the detailed description of the preferred embodiments describes flow meters, per se, it is to be understood that the flow meter can be combined with a valve and used to control the flow of a fluid. Accordingly, unless otherwise clearly indicated, the term flow meter as used in the specification and claims includes both flow meters and flow controllers.

And while the sensor assembly is described with regard to mass flow instruments, the flow sensor assembly of the present invention can also be employed in volume flow instruments or in any instrument where it is desired to take advantage of its quick response to changes in flow and excellent linearity over a wide range of operating conditions. Structural and functional details are not necessarily to be interpreted as limiting, but as a basis for the claims.

Referring to FIG. 1, fluid paths A and B constitute the fluid passage through a flow meter from the inlet $P_1$ to the outlet $P_2$. The line labelled PATH A represents fluid flow through the flow sensor assembly of the flow meter and the line designated PATH B represents fluid flow through the flow splitter section.

In the particular embodiments illustrated herein, PATH A depicts the fluid flow through a flow sensor assembly containing a flow tube of sufficient elongation to assure laminar flow at the desired flow rate. PATH B depicts the fluid flow through a flow splitter which is also constructed and proportioned to assure laminar flow. The method by which this is accomplished is known in the art and need not be further described, although a flow meter containing an advantageous flow splitter is described in U.S. Pat. No. 4,524,616, which patent is incorporated herein by reference.

Referring to FIG. 2, a mass flow meter 10 has an elongate housing 12 with a fluid inlet 14, a fluid outlet 16 and a fluid passage between the two. The fluid passage contains a flow splitter section 19 and is operationally connected in parallel to a flow sensor assembly 20 which measures the rate of fluid flow.

Referring additionally to FIG. 3, a portion of a flow sensor assembly 20 is illustrated. The flow sensor assembly 20 includes a flow tube 22 forming an axial fluid path therethrough. The flow tube 22 has a thermally diffusive sensor region defined by an upstream resistance thermometer 24 spaced apart from a downstream resistance thermometer 26. The upstream resistance thermometer 24 and the downstream resistance thermometer 26 are formed by winding a single layer of fine, uninsulated sensor wire around the flow tube 22.

The fastest response is obtained when the heat transfer between the resistance thermometers, 24 and 26, is as high as possible, when the heat transfer between the resistance thermometers and the gas is as unrestricted as possible, when the upstream and downstream resistance thermometers have lengths which are as short as possible, and when the two resistance thermometers are as close to one another as possible. Additionally, when the measurements are to be subject to electronic signal conditioning, it is desirable to have a reasonably high resistance of from about 300 to about 500 ohms in each resistance thermometer, 24 and 26.

The flow tube 22 is very thin and elongate, and in this exemplary embodiment has an inside diameter of about 0.25 mm and a length of about 100 mm. The flow tube 22 can be made entirely of thermally diffusive (thermal conductivity divided by density and specific heat) material, when the flow meter 10 is used in non-semiconductor applications. In the context of flow meters in accordance with this invention, a thermally diffusive material is one having a thermal diffusivity greater than about $5 \times 10^{-5}$ m²/sec. For example, gold, having a thermal diffusivity of about $1 \times 10$ m²/sec, is a thermal diffusive material, while stainless steel, having a thermal diffusivity of about $4 \times 10^{-6}$ m²/sec, is not.

However, in those embodiments where the flow meter 10 is used in semi-conductor applications, it is not practical to make flow tube 22 entirely of thermally diffusive material. Thermally diffusive materials, such as copper or gold, can react with the process gases and "poison" silicon semiconductor devices, even in the minute quantities that might occur due to evaporation from the inside of the flow tube. In these applications the outside surface of a non-reactive flow tube is coated with a thermally diffusive material. Any nonreactive metal can be used to form the flow tube 22. Preferred metals include type 316 or 316L stainless steel and monel.

The outside surface of the sensor region of the flow tube 22 is coated with a thermally diffusive material 27. The material should have as high a thermal diffusivity as practically available. The preferred materials have a thermal diffusivity from about $1 \times 10^{-4}$ m²/sec to about $2 \times 10^{-4}$ m²/sec. Preferred materials include copper, gold, silver or aluminum. Gold is most preferred, because of its corrosion resistance and long term stability.

The thermally diffusive sensor region increases the rate of heat transfer between the resistance thermometers, 24 and 26, and improves the speed of response of the sensor assembly 20 to changes in the gas flow rate.

In normal operation at a particular flow rate, there is a temperature difference between the upstream and downstream resistance thermometers, 24 and 26. When a variation in the flow rate occurs, just how quickly a new flow reading is established is determined by the time it takes for the temperature difference between the two resistance thermometers, 24 and 26, to stabilize at a new equilibrium value. For example, if the flow sensor assembly 20 is operating at 100% flow and a change to 10% flow is initiated, heat must be transferred from the downstream resistance thermometer 26 to the upstream thermometer 24 to establish a new equilibrium, before a true flow reading is made. Most of this heat is transferred through flow tube 22. By coating the outside surface of the sensor region of the flow tube 22 with copper, gold or other diffusive material, the time required for this transition can be greatly reduced.

The outside surface of the thermally diffusive sensor region is coated with an electrically insulating material 28, when the resistance thermometers, 24 and 26, are made from uninsulated sensor wire. The electrically insulating coating 28 is used to avoid the individual coils of wire indirectly shorting one another through the electrically conductive sensor region. Direct shorting of the individual coils is avoided by controlling the pitch of the coil winding during manufacturing to leave an air gap, which acts as an insulator, between the individual coils.

Any material which prevents the shorting of the individual coils can be used. Preferred electrically insulating materials include polyamide coatings, such as Pyralin polyamide coating #PI 2556, sold by E.I. duPont de Nemours, Wilmington, Del.

The length of the sensor wire and, therefore, the length of the winding forming the resistance thermometers, 24 and 26, determines the resistance for a given wire diameter. The use of a high resistance sensor wire is preferred to minimize the length of the resistance thermometers, 24 and 26, and to simplify the signal conditioning. Because resistance increases as the wire's diameter decreases, the smallest practical diameter is also preferred. Typically, the sensor wire has a diameter of from about 0.0003 inches to about 0.0005 inches, preferably only about 0.0004 inches. Each turn of the sensor wire is spaced about 0.0006 inches from the revolution on either side.

The length of resistance thermometers, 24 and 26, and their spacing from one another depend upon how closely the turns of wire can be wound without causing shorting between the individual coils due to manufacturing variations in winding spacing and how low an electrical resistance can be practically integrated into the electronic signal conditioning. The length and spacing to be used with a particular flow meter will be readily determinable by one skilled in the art. Typically, the resistance thermometers, 24 and 26, are from about 0.060 to about 0.200 inches, preferably about 0.150 inches, long and spaced from about 0.015 to about 0.060 inches, preferably about 0.030 inches, from one another.

It is an advantage of the sensor assembly 20 that its manufacture can be simplified by winding both the upstream and the downstream resistance thermometers, 24 and 26, in the same direction of rotation. When the direction of rotation is reversed, production is slowed, in order to allow the wire to be secured in some manner at the point of reversal. However, if desired, the upstream and downstream resistance thermometers, 24 and 26, can be wound in opposite directions.

The resistance thermometers, 24 and 26, are attached to the termination wires 30 at connector pads 32. It is another benefit of the use of very fine, uninsulated sensor wire that the bare wire is readily attached to the termination wires 30 by conventional solder or conductive epoxy, without the necessity of stripping the insulation off pre-insulated wire. The termination wires 30 are very fine copper wires having a diameter of from about 0.001 to about 0.005, preferably about 0.002 inches.

The connector pads 32 are formed by winding the uninsulated sensor wire around the flow tube 22 with very little or zero spacing between the individual turns of wire for a short distance. The axial distance between the pads 32 and each side of the resistance thermometers, 24 and 26, is from about 0.005 to about 0.020 inches, preferably about 0.015 inches. The connector pads 32 are typically from about 0.004 to about 0.010 inches, preferably about 0.006 inches long.

The connector pads 32 form an ideal surface for attaching the termination wires 30. Because the connector pads 32 allow intimate contact with solder or conductive epoxy, the termination wires 30 can be attached with a relatively small amount of material. This overcomes problems encountered in conventional sensor assemblies due to excessive thermal mass which slows the resistance thermometers' response.

Conventional resistance thermometers, formed by winding multiple layers of insulated sensor wire, generally having a diameter of about 0.0006 inches, can also be employed. When properly insulated wires are used, there is no need for the electrically insulating coating 28.

The flow sensor assembly 20 can also be made by using an independent heater (not shown) located between the two resistance thermometers, 24 and 26. Typically, the heater is operated at a constant power dissipation and the two resistance thermometers, 24 and 26, are operated at a very low power level, so that they do not add appreciable heat to the system.

Closely spaced, axially from the sensing region of the flow tube 22 is an inner housing 34 made of a material which is both electrically conductive and thermally diffusive, such as aluminum, copper, silver or gold. The distance between the flow tube 22 and the inner housing 34 is from about 0.020 to about 0.080 inches, preferably about 0.035 inches.

In preferred embodiments, the inner housing 34 has a low mass. The mass of the inner housing 34 is minimized by fabricating the housing from as thin a material as can be practically formed and handled during assembly. The thickness typically is from 0.001" to about 0.010", preferably about 0.003".

During the operation of the flow meter 10, the flow meter may be subjected to outside, thermal influences, such as heating or cooling or to air drafts. Unless the sensor region is adequately shielded, these thermal influences can upset the temperature balance between the resistance thermometers, 24 and 26.

Because the inner housing 34 is thermally conductive, it substantially eliminates the effects of outside, thermal influences on the sensor region. A substantially uniform temperature is maintained throughout the length of the inner housing 34, so that the inner housing evenly heats or cools the resistance thermometers, 24 and 26, without inducing a temperature differential between them.

The close-fitting inner housing 34 also serves to improve attitude sensitivity by reducing free convection currents on the outside of the sensor region, which could otherwise arise when the flow sensor assembly 20 is tilted so that one resistance thermometer is higher than the other. The flow sensor assembly 20 has a very narrow space between the sensor region and the inner housing 34—substantially that of a boundary layer— thereby reducing free convection currents.

Referring additionally to FIG. 4, the open ends of the inner housing 34 are physically sealed by end pieces 35. Each end piece 35 contains an opening through which the flow tube 22, passes. The end pieces 35 are made of an electrically conductive material, so that an electrical connection is made between the surface of the opening and the surface of the flow tube 22. The base of each electrically conductive end piece 35 is grounded to a printed circuit board 36.

Because the inner housing 34 is electrically conductive, it additionally acts as an electrical shield protecting the resistance thermometers, 24 and 26, from electromagnetic waves or electrical currents induced by outside radiating sources. To electrically shield the entire length of the sensor region, the flow tube 22 passes through the end pieces 35 near each end of the sensor region.

The printed circuit board 36 provides for simple and easy assembly of the sensor assembly and protects sensitive parts from outside damage. The printed circuit board 36 contains means for completing the electronic sensor bridge (not shown) and means for grounding the end pieces 35. In some embodiments, the printed circuit board 36 also contains padding resistors which balance manufacturing variations in the resistance of the thermometers, 24 and 26, and an electrical connector for plugging in a signal conditioning printed circuit board (not shown).

Printed circuit board 36 supports an outer housing 38. The outer housing 38 is made of an electrically conductive and thermally diffusive material, such as aluminum, copper, silver or gold and is located a short radial distance from the inner housing 34. The distance between the outer housing 38 and the inner housing 34 is about 0.020 to about 0.080 inches, preferably about 0.035 inches. The open ends of the outer housing 34 are also sealed by end pieces 35, so that the outer housing 38 is also electrically connected to the flow tube 22 near the ends of the sensor region and grounded to the printed circuit board 36.

The combination of the inner housing 34 and the outer housing 38 decreases the warm-up time of the flow sensor assembly 20, i.e., the time from the moment electrical power is applied until the time the resistance thermometers, 24 and 26, come to thermal equilibrium, while providing to the sensor region added protection against air drafts.

If the inner housing 34 were so massive that it alone effectively isolated the sensor region from stray air currents, the warm-up time would be excessive. Instead, the outer housing 38, separated from the inner housing 34 by a layer of air, combines with the inner housing to effectively isolate the sensor region from air drafts and electromagnetic interference and allow rapid warm-up of the flow sensor assembly 20.

Additionally, the combination of the inner housing 34 and the outer housing 38 significantly reduces problems with free convection currents. Residual and undesirable tilt signals which might otherwise arise because of natural convection on the outside of a single housing are reduced by the additional boundary layer, which is formed between the inner housing 34 and the outer housing 38.

What we claim and desire to protect by letters patent is:

1. A mass flow sensor assembly formed with flow tube defining an axial passage through the assembly comprising:
   a sensor region of the flow tube;
   a first resistance thermometer in thermal contact with the sensor region;
   a second resistance thermometer, spaced apart from the first resistance thermometer, in thermal contact with the sensor region;
   means for attaching terminal wires to the first and second resistance thermometers to complete an electronic sensor bridge;
   an inner housing made of an electrically conductive and thermally diffusive material closely spaced, radially to the sensor region and electrically connected to the flow tube near the ends of the sensor region; and
   an outer housing made of an electrically conductive and thermally diffusive material closely spaced, radially from the inner housing, where the outer housing is made of copper, silver, aluminum or gold; and
   wherein the sensor region is coated with an electrically insulating material and wherein the first and second resistance thermometers are formed of a single layer of a fine, uninsulated wire; and wherein the diameter of the resistance thermometer wire is from about 0.0003 to about 0.0005 inches.

2. A flow sensor assembly in accordance with claim 1, wherein the diameter of the wire is about 0.0004 inches.

3. A mass flow sensor assembly formed with flow tube defining an axial passage through the assembly comprising:

a sensor region of the flow tube;

a first resistance thermometer in thermal contact with the sensor region;

a second resistance thermometer, spaced apart from the first resistance thermometer, in thermal contact with the sensor region;

means for attaching terminal wires to the first and second resistance thermometers to complete an electronic sensor bridge;

an inner housing made of an electrically conductive and thermally diffusive material closely spaced, radially to the sensor region and electrically connected to the flow tube near the ends of the sensor region;

an outer housing made of an electrically conductive and thermally diffusive material closely spaced, radially from the inner housing wherein the outer housing is made of copper, silver, aluminum or gold; and wherein the inner housing is radially spaced from about 0.020 to about 0.080 inches from the sensing region of the flow tube.

4. A mass flow sensor assembly formed with flow tube defining an axial passage through the assembly comprising:

a sensor region of the flow tube;

a first resistance thermometer in thermal contact with the sensor region;

a second resistance thermometer, spaced apart from the first resistance thermometer, in thermal contact with the sensor region;

means for attaching terminal wires to the first and second resistance thermometers to complete an electronic sensor bridge;

an inner housing made of an electrically conductive and thermally diffusive material closely spaced, radially to the sensor region and electrically connected to the flow tube near the ends of the sensor region;

an outer housing made of an electrically conductive and thermally diffusive material closely spaced, radially from the inner housing, wherein the outer housing is made of copper, silver, aluminum or gold; and wherein the outer housing is radially spaced from about 0.020 to about 0.080 inches from the inner housing.

5. A mass flow sensor assembly formed with flow tube defining an axial passage through the assembly comprising:

a sensor region of the flow tube;

a first resistance thermometer in thermal contact with the sensor region;

a second resistance thermometer, spaced apart from the first resistance thermometer, in thermal contact with the sensor region;

means for attaching terminal wires to the first and second resistance thermometers to complete an electronic sensor bridge;

an inner housing made of an electrically conductive and thermally diffusive material closely spaced, radially to the sensor region and electrically connected to the flow tube near the ends of the sensor region;

an outer housing made of an electrically conductive and thermally diffusive material closely spaced, radially from the inner housing, wherein the outer housing is made of copper, silver, aluminum or gold; and further comprising a printed circuit board, electrically grounded to the inner and the outer housings, for mounting the outer housing.

6. A mass flow sensor assembly formed with a flow tube defining an axial passage through the assembly comprising:

a sensor region of the flow tube;

a first resistance thermometer in thermal contact with the sensor region;

a second resistance thermometer, spaced apart from the first resistance thermometer, in thermal contact with the sensor region;

means for attaching terminal wires to the first and second resistance thermometers to complete an electronic sensor bridge;

an inner housing made of an electrically conductive and thermally diffusive material closely spaced, radially to the sensor region and electrically connected to the flow tube near the ends of the sensor region;

an outer housing made of an electrically conductive and thermally diffusive material closely spaced, radially from the inner housing; and a printed circuit board, electrically grounded to the inner and outer housings, for mounting the outer housing.

7. A flow sensor assembly in accordance with claim 6, wherein the inner housing is radially spaced from about 0.020 to about 0.080 inches from the sensing region of the flow tube.

8. A flow sensor assembly in accordance with claim 6 wherein the sensor region is coated with an electrically insulating material and wherein the first and the second resistance thermometers are formed of a single layer of a fine, uninsulated wire.

9. A flow sensor assembly in accordance with claim 8, wherein the diameter of the wire is from about 0.0003 to about 0.0005 inches.

10. A flow sensor assembly in accordance with claim 9, wherein the diameter of the wire is about 0.0004 inches.

11. A mass flow sensor assembly formed with a flow tube defining an axial path through the assembly comprising:

a sensor region of the flow tube, where the outside surface of the sensor region is coated with an electrically insulating material;

a first resistance thermometer, in thermal contact with the outside surface of the sensor region, formed of a single layer of a fine, uninsulated wire wound around the outside surface of the sensor region;

a second resistance thermometer, spaced apart from the first resistance thermometer, and in thermal contact with the outside of the sensor region, formed of a single layer of a fine, uninsulated wire wound around the outside surface of the sensor region, the diameter of the first and second resistance thermometer wire being from about 0.0003 to about 0.0005 inches; and the first and second resistance thermometers having means for attaching terminal wires to complete an electronic sensor bridge.

12. A flow sensor assembly in accordance with claim 11, wherein the diameter of the wire is about 0.0004 inches.

13. A flow sensor assembly in accordance with claim 11, wherein the electrically insulating material is a polyamide.

14. A mass flow sensor assembly formed with a flow tube defining an axial passage through the assembly comprising:

a sensor region of the flow tube;

a first resistance thermometer in thermal contact with the sensor region;

a second resistance thermometer, spaced apart from the first resistance thermometer, in thermal contact with the sensor region;

means for attaching terminal wires to the first and second resistance thermometers to complete an electronic sensor bridge;

an inner housing made of an electrically conductive and thermally diffusive material closely spaced, radially to the sensor region and electrically connected to the flow tube near the ends of the sensor region; and an outer housing made of an electrically conductive and thermally diffusive material closely spaced, radially from the inner housing, the outer housing being spaced from about 0.020 to about 0.080 inches from the inner housing.

15. A flow sensor assembly in accordance with claim 14, wherein the axial lengths of the first and second resistance thermometers are from about 0.060 to about 0.200 inches.

16. A flow sensor assembly in accordance with claim 15, wherein the axial lengths of the first and second resistance thermometers are about 0.150 inches.

17. A flow sensor assembly in accordance with claim 14, wherein the axial distance between the first and second resistance thermometers is from about 0.015 to about 0.060 inches.

18. A flow sensor assembly in accordance with claim 17, wherein the axial distance between the first and second resistance thermometers is about 0.030 inches.

19. A flow sensor assembly in accordance with claim 14, wherein the first and second resistance thermometers are wound in the same direction of rotation around the sensor region.

20. A flow sensor assembly in accordance with claim 14, wherein the resistance thermometers have a resistance of from about 300 to about 500 ohms.

21. A flow sensor assembly in accordance with claim 14, wherein the means for attaching the terminal wires are formed by winding the uninsulated sensor wire around the flow tube with sufficiently close spacing and for sufficient distance to form connector pads.

* * * * *